United States Patent [19]

van Lith

[11] Patent Number: 4,906,225

[45] Date of Patent: Mar. 6, 1990

[54] ASSEMBLED DRIVING BELT

[75] Inventor: Johannes H. van Lith, Berlicum, Netherlands

[73] Assignee: Van Doorne'e Transmissie B.V., Tilburg, Netherlands

[21] Appl. No.: 295,162

[22] Filed: Jan. 9, 1989

[30] Foreign Application Priority Data

Feb. 11, 1988 [NL] Netherlands ............ 8800336

[51] Int. Cl.⁴ ............................................. F16G 1/22
[52] U.S. Cl. .................................................. 474/242
[58] Field of Search ................. 474/201, 237, 242–245

[56] References Cited

U.S. PATENT DOCUMENTS 4,281,483  5/1981  Horowitz et al. ..................... 51/328
4,303,403 12/1981  Lamers ............................ 474/242 X

FOREIGN PATENT DOCUMENTS 0014013  1/1980  European Pat. Off. .
0073962  3/1983  European Pat. Off. ............ 474/242
58-81252  8/1983  Japan .
62-147143 12/1987  Japan .
2013116  8/1979  United Kingdom .

Primary Examiner—Thuy M. Bui
Attorney, Agent, or Firm—Pennie & Edmonds

[57] ABSTRACT

In a contnuous transmission belt, cross elements of a driving belt are provided with coupling elements in the shape of at least one prjection (6) at one main side (1) and a recess (7) at the other main side (2). In order to improve the trasition of cross elements going in and out of the pulleys in the transmission the contour of the projections and of the corresponding recesses is approximated by a circular arc R.

6 Claims, 1 Drawing Sheet

ASSEMBLED DRIVING BELT

FIELD OF THE INVENTION

The invention relates to a driving belt having a substantially trapezoidal cross-section for use on V-shaped pulleys, said driving belt consisting of one or more endless carriers as well as a number of generally planar cross elements, assembled on the carrier(s) and butting against one another, the lower portions of said cross elements below said carriers being tapered radially inwardly in order to enable the driving belt to curve, wherein the cross elements are in contact with one another at the location of a tilting zone, at which the planar upper portion of the cross element meets its tapered lower portion, and wherein the cross elements above the tilting zone are provided with cooperating coupling means comprising at least one projection from one side of the planar upper portion of each cross element and a mating recess on the other side thereof.

BACKGROUND OF THE INVENTION

Driving belts of this general type are known from European Patent 14013 and is being used in practice. Engagement of the coupling means of the cross elements ensures sufficient centering of the cross elements in the straight parts of the driving belt between the two pulleys. The coupling means becomes disengaged in the curved parts of the driving belt, where the belt goes around the location of the V-shaped pulleys, so that the mutual centering is lost there, which provides the cross elements with some freedom to locate themselves into a position which makes a good grip of the cross elements in the pulleys possible. This known driving belt is satisfactory but nevertheless it has a number of drawbacks. In particular, the coupling means become disengaged only with difficulty or only partly, as a result of which there will be an overlocating of the cross elements between the pulleys. That is, the projections tend not to be fully released from the mating recesses. Because of this overlocating, the positioning of the cross element is not only determined by the pulley but also by the adjacent cross elements and the carriers and, the grip of the cross elements will not be optimal. All this can be compensated by accepting a greater clearance between the coupling elements. This has a negative effect on the centring of the cross elements in the straight parts, however. In this known driving belt it will always be necessary to search for a compromise between overlocation and clearance, therefore.

SUMMARY AND OBJECTS OF THE INVENTION

The purpose of the invention is to obviate the above drawbacks. For this purpose the driving belt according to the invention is characterized in that the projection of each cross element has a contour which can be approximated at least partly by one or more circular arcs which are described by radii having their origin at the location of the tilting line, that is, a line along which the planar main face of the cross element meets the plane of the tapered leg portion, and that the recess has at least partly a complementary contour.

According to the invention the movement of the coupling means towards and away from one another is facilitated considerably, whereby sufficient clearance between the coupling means is produced in the curved parts to release the engagement and therewith the overlocating, whilst a much smaller clearance is present in the straight parts, as a result of which an optimum centering in the straight parts is obtained.

According to a further elaboration of the invention the projection is made conical. The flank of the conical projection, which can be approximated by the above-mentioned circular arcs because of the limited height of the projection, thereby preferably makes an included angle with a normal at the main side of the cross element which corresponds to the acute angle between the plane of the main surface and the tapered surface of the cross element.

The invention furthermore relates to a cross element such as can be used in the aforesaid driving belt according to the invention and as described in the claims.

BRIEF DESCRIPTION OF THE DRAWING

The invention will be explained hereinafter with reference to two embodiments and a drawing. In the drawing:

FIG. 4a is a side view of the cross element according to FIG. 3;

FIG. 4b is a detail of a coupling means according to FIG. 4a, and

DESCRIPTION OF THE PREFERRED EMBODIMENTS

Figure 1:
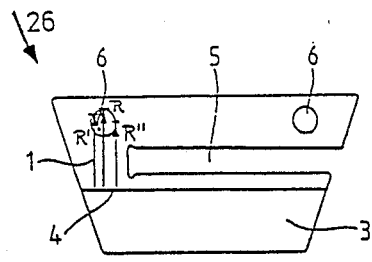
FIG. 1 is an embodiment of a cross element with coupling means according to the invention.
Figure 2:
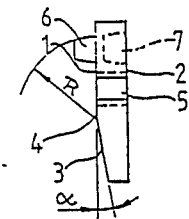
FIG. 2 is a side view of the cross element according to FIG. 1.

The assembled driving belt according to the invention consists of a carrier 27, which may e.g. consist of one or more metal bands, and cross elements 26 placed thereon. The assembled driving belt 23 is put on a primary pulley 21 with a primary shaft 24 and a secondary pulley 22 with a secondary shaft 25. The driving belt 23 describes two straight parts between the primary and the secondary V-shaped pulleys 21 and 22 respectively and describes curved parts at the location of the primary pulley 21 and at the location of the secondary pulley 22.

The cross element 26 (FIGS. 1-4) is provided with two parallel, planar main sides 1, 2 which come into contact with the main sides of adjacent cross elements in the assembled driving belt. The main side 1 is provided with a tapered leg portion 3, also generally planar, extending radially inwardly. The planes of the main side 1 and the tapered portion 3 make an acute angle α. The line along which the planes of the main side portion 1 and tapered leg portion 3 would intersect the tilting line 4. These planes can meet at a relatively sharp line or at a relatively broadly radiused "tilting" zone. It will be apparent to those skilled in the art that if the transition between the planes is smoothly radiused, the belt will be smoother in operation, and typically less noisy and more durable as well. Reference herein to the "tilting line" 4 at which these planes meet should be understood to refer to the line along which the two planes would intersect. During curving of the driving belt the cross elements will keep in contact with one another at the location of said tilting line 4. The cross element 26 is constructed trapezoidally with side flanks 8 for engagement with the V-shaped pulleys 21, 22.

The cross element is provided with one (FIGS. 1, 2) or more (FIGS. 3, 4) recesses for accommodating one or more carriers 27 respectively. The cross element is furthermore provided with one (FIGS. 3, 4) or more (FIGS. 1, 2) coupling means. The coupling means comprise projections 6 on one main side 1 and corresponding recesses 7 in the opposed main side 2. With successive cross elements the projections 6 engage the recesses 7 of the abutting element, at least in a straight part of the driving belt, so that a mutual centering of the cross elements can take place. The coupling means are provided above the tilting line so that the projection 6 of the cross element and the recess 7 of an adjacent cross element move away from each other as soon as the driving belt is curved. The centering effect is thereby released so that the cross elements are provided mutual freedom of movement and can locate themselves for positive grip in the pulleys.

The known coupling means according to the state of the art are generally satisfactory but do not function optimally. Usually the projections 6 and the recesses 7 do not become disengaged completely so that the adjacent cross elements keep influencing one another's positioning in the curved part. The cross element also wants to adjust its position to the pulley so that the cross element is overlocated in said curved part. This results in a grip of the cross elements in the pulleys which is not optimal, causing loss of power and limitation of the life span. By itself the overlocating of the coupling means in the pulleys can be eliminated by providing greater clearance between the projection 6 and the recess 7, so that a mutual contact in the pulleys is no longer possible. On the other hand a greater clearance has a negative effect on the necessary centering effect in the straight part.

The above drawbacks can be obviated according to the invention by giving the projection a contour which, in a cross section taken in a plane parallel to one including the center line of the carrier, can at least partly be approximated by one or more circular arcs which are described by radii having their origin at the line at which the plane of the face 1 would meet the plane of the tapered legs 3, and the recess at least partly having a complementary contour. In the embodiment according to FIGS. 1 and 2 the contour of the upper half of the projection 6 can at least partly be described by means of circular arcs having radii R, R', R" etc. which have their origin on the tilting line 4. The lower half of the projection 6, i.e. that half which is located under the centre line of the projection which runs parallel to the tilting line 4, is provided with a correspondingly mirrored contour. The top of the projection 6 is flattened. The recess 7 has a contour which is complementary to the contour of the projection. As a result of this measure it will be possible to keep the clearance between the projection 6 and the recess 7 very small, which results in an optimum centring effect in the straight part whilst on the other hand the overlocating in the curved part has been eliminated.

Figure 3:
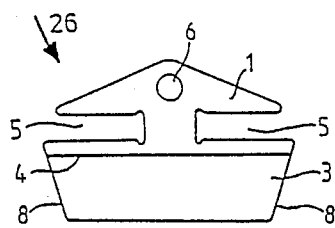
FIG. 3 is another embodiment of a cross element with conical coupling means according to the invention.
Figures 4A, 4B:
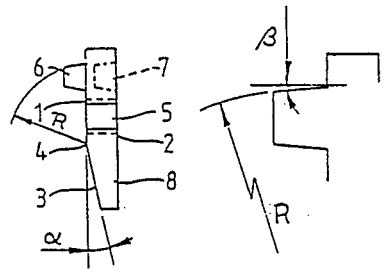
Figure 5:
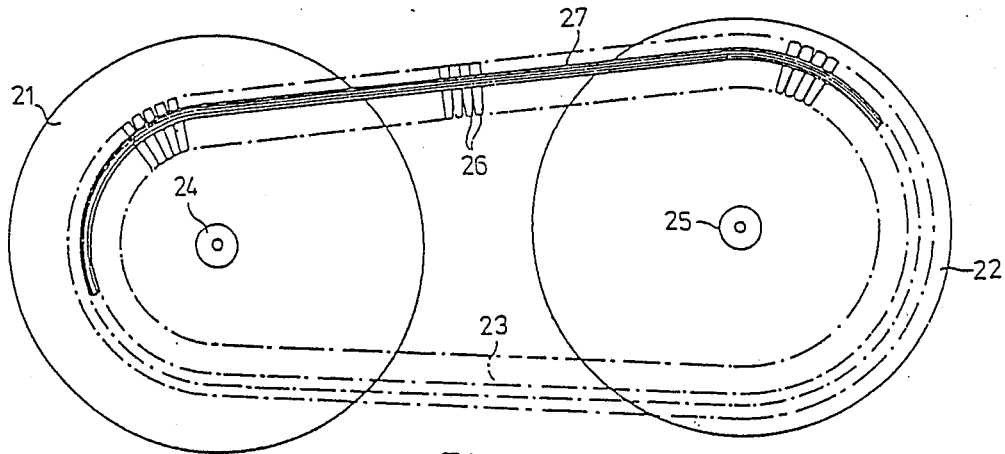
FIG. 5 shows an assembled driving belt according to the invention.

In the embodiment of a cross element according to FIG. 3 and FIGS. 4a, 4b the recess 7 and the projection 6 are conical. The upper half of the conical projection 6 can be approximated with circular arcs whose radii have their origin at the location of the tilting line 4, as the flanks of the conical contour must be described with a limited segment of the circular arcs only, because of the limited height of the conical projection. The recess 7 again has a complementary contour. The angle $\beta$ which the flank of the conical projection 6 includes with a normal on the main side 6 is a good approximation of a circular arc of radius R extending from the tilting line 4, and is preferably of a magnitude which corresponds with that of the acute angle $\alpha$ between the main side 1 and the taper 3. See FIGS. 4a and 4b.

As the tilting zone generally does not describe a clearly defined line but is rounded off to form a roll-off area, which provides a smoother transition between the straight and curved runs of the belt. The angle $\beta$ is preferably a few degrees greater than the angle $\alpha$ in order to compensate the effect of said roll-off area.

It will be apparent that the invention has not been described exhaustively with reference to the embodiments and that within the scope of the invention various modifications will be apparent to the person skilled in the art. Thus the part of the projection according to FIGS. 1 and 2 or 3 and 4 which lies under the centre line which runs parallel to the tilting line may e.g. be left out, whilst the illustrated contour of the recess is maintained. Also it will be possible for the recess and the projection to have greatly different contours which are only complementary over a limited functional area. This and other modifications are considered to fall within the scope of the invention.

I claim:

1. A driving belt having a substantially trapezoidal cross-section for use of V-shaped pulleys, said driving belt consisting of one or more endless carriers and a number of cross elements, said cross elements being generally planar and butting against one another along said one or more endless carriers, said cross elements having first planar surface portions wherein their planar surfaces perpendicular to the one or more carriers are parallel to one another, and tapered leg portions, at least one surface of each of said tapered leg portions meeting at least one of said first planar surfaces at a tilting zone, whereby the tapered leg portions contact one another as the belt is curved around a pulley and the first planar surface portions contact one another when the belt is straight between pulleys, each of said cross elements including at least one projection extending outwardly from one of the first planar surfaces thereof and a corresponding recess disposed on the other planar surface thereof for receiving the projection of an adjoining cross element, wherein the projection has at least an upper contour which in cross section is approximated by a circular arc extending from an origin along a tilting line at which the tapered leg portion meets the first planar surface portion, and wherein the recess has a complementary contour.

2. The driving belt according to claim 1, wherein the projection is frusto-conical.

3. Driving belt according to claim 2, wherein the upper flank of the projection meets the first planar surface from which it extends at an angle with respect to a normal to the first planar surface which is substantially equal to the angle formed between the first planar surface of the cross element and the tapered leg portion thereof.

4. A cross element for a driving belt having a substantially trapezoidal cross-section for use on V-shaped pulleys, said driving belt consisting of one or more endless carriers and a number of cross elements, said cross elements being generally planar and butting against one another along said endless carriers, said cross element having first planar surface portions wherein its planar surfaces perpendicular to the at least one carrier are parallel to one another, and at least one tapered leg portion, said tapered leg portion meeting one of said first planar surfaces at a tilting zone, said cross element including at least one projection extending outwardly from one of the planar surfaces thereof and a corresponding recess disposed on the other planar surface thereof for receiving the projection of an adjoining cross element, wherein the projection has at least an upper contour which in cross section is approximated by a circular arc extending from an origin at a tilting line along which the tapered leg portion meets the planar surface portion, and wherein the recess has a complementary contour.

5. The cross element according to claim 4, wherein the projection is conical.

6. The cross element according to claim 4, wherein the upper flank of the projection meets the first planar surface from which it extends at an angle with respect to a normal to the main planar surface which is substantially equal to the angle formed between the first planar surface of the cross element and the tapered leg portion thereof.

* * * * *

UNITED STATES PATENT AND TRADEMARK OFFICE
CERTIFICATE OF CORRECTION

PATENT NO. : 4,906,225

DATED : March 6, 1990

INVENTOR(S) : Johannes H. van Lith

It is certified that error appears in the above-identified patent and that said Letters Patent is hereby corrected as shown below:

ON TITLE PAGE: item [73] Assignee, please delete "Van Doorne'e Transmissie B.V." and insert therefor --Van Doorne's Transmissie B.V.--;

In the ABSTRACT, line 1, please delete "contnuous" and insert therefor --continuous--;

In the ABSTRACT, line 3, please delete "prjection" and insert therefor --projection--;

In the ABSTRACT, line 5, please delete "trasition" and insert therefor --transition--; and At column 4, line 30, please delete "of" and insert therefor --on--.

Signed and Sealed this

Nineteenth Day of November, 1991

Attest:

HARRY F. MANBECK, JR.

*Attesting Officer*      *Commissioner of Patents and Trademarks*